United States Patent
Park et al.

(10) Patent No.: US 8,265,037 B2
(45) Date of Patent: Sep. 11, 2012

(54) LOCAL MOBILITY MANAGEMENT APPARATUS FOR TOTAL MOBILITY MANAGEMENT, AND TOTAL MANAGEMENT METHOD AND SYSTEM

(75) Inventors: Hyun-Seo Park, Daejeon (KR); Gyung-Chul Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 12/677,969

(22) PCT Filed: Apr. 16, 2008

(86) PCT No.: PCT/KR2008/002128
§ 371 (c)(1),
(2), (4) Date: Jul. 30, 2010

(87) PCT Pub. No.: WO2009/035197
PCT Pub. Date: Mar. 19, 2009

(65) Prior Publication Data
US 2010/0284329 A1   Nov. 11, 2010

(30) Foreign Application Priority Data
Sep. 14, 2007  (KR) .......................... 10-2007-0093816

(51) Int. Cl.
*H04W 4/00* (2009.01)
(52) U.S. Cl. ........................................ 370/331
(58) Field of Classification Search .................. None
See application file for complete search history.

(56) References Cited

U.S. PATENT DOCUMENTS 7,706,301 B2 * 4/2010 Petrescu et al. ............... 370/254
2003/0182433 A1   9/2003 Kulkarni et al.
2004/0141477 A1 * 7/2004 Xu et al. ....................... 370/328
2005/0041808 A1   2/2005 He
2006/0140150 A1 * 6/2006 Olvera-Hernandez et al. .......................... 370/331
2007/0253371 A1 * 11/2007 Harper et al. ................. 370/331

FOREIGN PATENT DOCUMENTS

JP   2005-136659        5/2005
WO   2009/035197 A1    3/2009

OTHER PUBLICATIONS

International Search Report and Written Opinion for Application No. PCT/KR2008/002128, dated Nov. 26, 2008.

* cited by examiner

*Primary Examiner* — Raj Jain
(74) *Attorney, Agent, or Firm* — Nelson Mullins Riley & Scarborough LLP; EuiHoon Lee, Esq.

(57) ABSTRACT

A local mobility management apparatus for total mobility management, and a total mobility management method and system are provided. A local domain mobility registration request message on a terminal is received from a mobile access gateway that receives a network attach message including information on a home agent from the terminal moving from a first local domain to a second local domain, a location of the terminal in an area managed by the mobile access gateway is registered, and a global domain mobility registration request message for reporting registration of the location to the home agent is transmitted. Accordingly, it is possible to remove a side effect generated in a case where a transmission order of a local domain mobility registration request message and a global domain mobility registration request message is disordered and provide an efficient mobility management.

12 Claims, 4 Drawing Sheets

LOCAL MOBILITY MANAGEMENT APPARATUS FOR TOTAL MOBILITY MANAGEMENT, AND TOTAL MANAGEMENT METHOD AND SYSTEM

RELATED APPLICATIONS

This application is a 35 U.S.C. §371 national filing of PCT Application No. PCT/KR2008/002128 on Apr. 16, 2008, which claims priory to, and the benefit of, Korean Patent Application No. 10-2007-0093816 filed on Sept. 14, 2007. The contents of the aforementioned applications are hereby incorporated by reference.

TECHNICAL FIELD

The present invention relates to a local mobility management apparatus for total mobility management, and a total mobility management method and system, and more particularly, to a local mobility management apparatus for total mobility management capable of removing a side effect generated in a case where a transmission order of a local domain mobility registration request message and a message for reporting the current location of the mobile node is disordered, and a total mobility management method and system.

The present invention is derived from a research project supported by the Information Technology (IT) Research & Development (R&D) program of the Ministry of Information and Communication (MIC) and the Institute for Information Technology Advancement (IITA) [2006-S-003-02, Next Generation Mobile Communication Service Platform].

BACKGROUND ART

As a wireless communication technique has been developed, the number of users who use the Internet based on a wireless terminal and a wireless mobile communication will be rapidly increased. Mobility management is important so as to provide communication environments without disconnection even when a user moves.

In a submission entitled 'Interactions between PMIPv6 and MIPv6' (published on Apr. 24, 2007) announced by IETF NETLMM WG group, a mobility management method in a case where a terminal moves between local domains is disclosed.

In the disclosed mobility management method, the mobility management in a local domain is performed. The mobile access gateway (MAG) transmits a message of requesting mobility registration to a local mobility anchor (LMA). Accordingly, the LMA registers and manages the local mobility of the mobile node.

In addition, the mobile node transmits a message of requesting mobility registration to a home agent (HA) for the mobility management in a global domain. Accordingly, the HA registers and manages the global mobility of the mobile node.

DISCLOSURE OF INVENTION

Technical Problem

In this case, there are following problems.

First, a synchronization problem between a mobility registration request message on the LMA which is transmitted from the MAG and a mobility registration request message on the HA which is transmitted from the terminal occurs. That is, if the MAG which transmits the mobility registration request message of the local domain is not synchronized with the terminal which transmits the mobility registration request message of the global domain, and if the message transmitted by the terminal firstly arrives in the order of the mobility management messages, the mobility management of the local domain may not operate. Specifically, if the HA which manages the terminal exists together with the LMA, this problem becomes serious.

Second, since the terminal has to embody a complex mobility management method for global mobility management and has to use a tunneling method so as to transmit data, waste of wireless resources is caused due to unnecessary tunneling overheads.

Third, the terminal has to have security association (SA) so as to authenticate and protect a message that is communicated so as to manage mobility. However, the Internet cannot efficiently provide the SA mechanism until now.

Fourth, if necessary, a route optimization process has to be performed with respect to each node to communicate with the moved terminal. There are signaling overheads for the route optimization process. Accordingly, the SA is also required.

Technical Solution

The present invention provides a local mobility management apparatus capable of solving a synchronization problem related to a transmission of a local domain mobility registration request message and a global domain mobility registration request message in which a tunneling process for transmitting data according to the mobility is unnecessary, a security association of a terminal for managing the mobility is not required, and more efficient mobility management is provided in local and global domains, and a total mobility management apparatus and method.

Advantageous Effects

In the present invention, mobility management in the local domain and mobility management in the global domain are performed by using the same method. The mobility management in the local domain and the mobility management in the global domain are performed based on a network. After a mobility registration message is processed in the local domain, a mobility registration message is transmitted to the global domain. Accordingly, it is possible to remove a conventional side effect caused by the order of the mobility registration message in the local domain and the mobility registration message in the global domain. In addition, the terminal needs not know a method of managing mobility. Accordingly, it is not necessary to perform a tunneling method so as to transmit data according to the mobility. In addition, the SA between the terminal and the home agent which is required for the global mobility management is unnecessary. On the other hand, since the route optimization process is performed by the local mobility management apparatus (local mobility anchor) and the mobile access gateway, efficient communication can be performed even through nodes and the terminal doesn't know complex mobility management. Afterwards, if wireless mobile Internet communication is widely distributed, mobility management is essential. It is possible to efficiently provide mobility of the terminal so that the terminal can communicate in any network, at any place, in any time.

DESCRIPTION OF DRAWINGS

The above and other features and advantages of the present invention will become more apparent by describing in detail exemplary embodiments thereof with reference to the attached drawings in which.

BEST MODE

Figure 1:
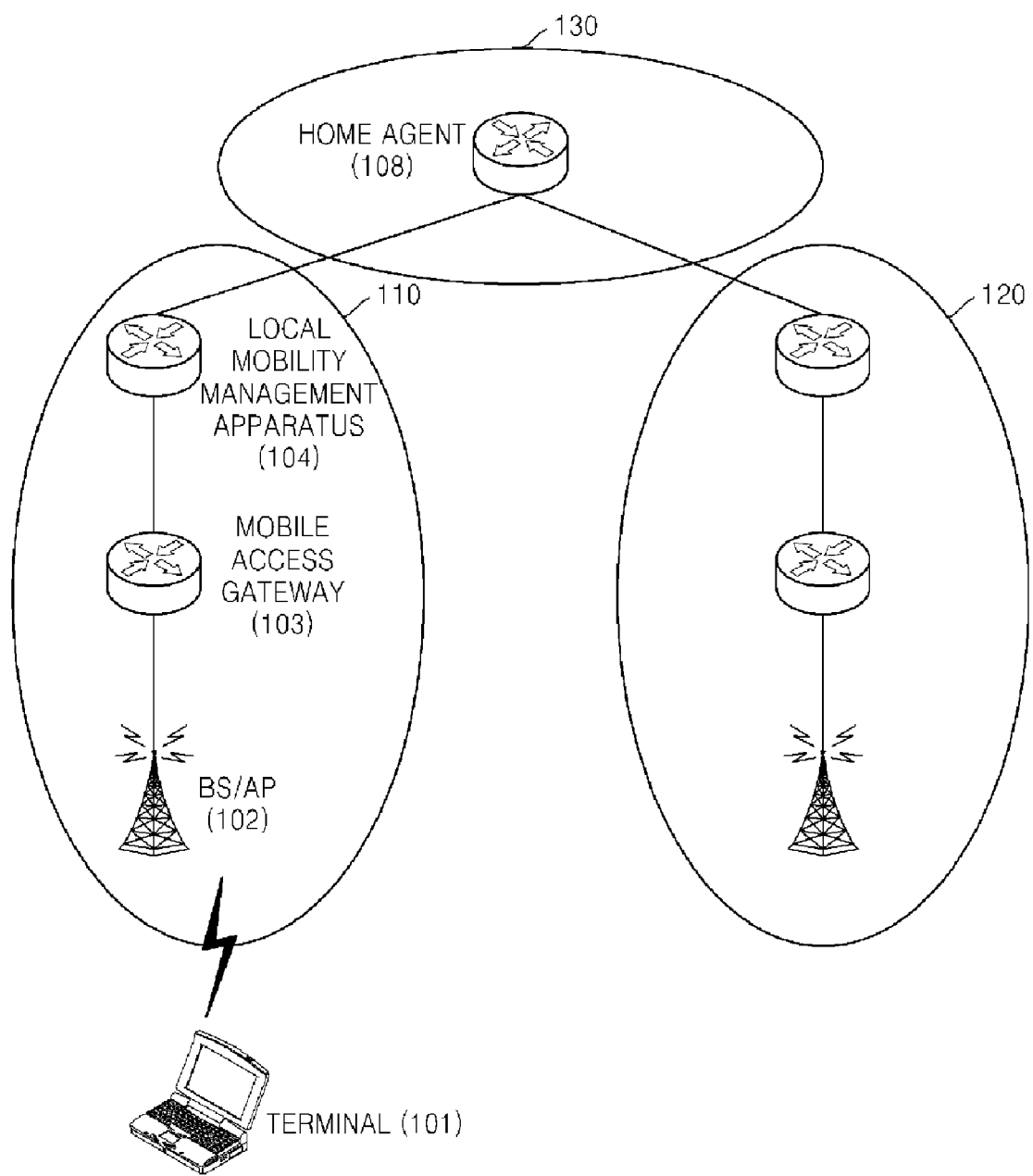
FIG. 1 illustrates a network configuration for managing mobility according to an embodiment of the present invention.

According to an aspect of the present invention, there is provided a local mobility management apparatus which receives data toward a terminal of which location is registered from a home agent for managing total mobility between local domains and transmits the data to a mobile access gateway that manages an area in which the terminal located, the local mobility management apparatus comprising: a local domain mobility registration request message receiving unit receiving a local domain mobility registration request message on the terminal from the mobile access gateway that receives a network attach message including information on the home agent from the terminal moving from a first local domain to a second local domain; a location registration unit registering the current location of the terminal in an area managed by the mobile access gateway according to the local domain mobility registration request message; and a global domain mobility registration request message transmission unit transmitting a global domain mobility registration request message for reporting registration of the location by the location registration unit to the home agent.

According to another aspect of the present invention, there is provided a total mobility management method which receives data toward a terminal of which location is registered from a home agent for managing total mobility between local domains and transmits the data to a mobile access gateway that manages an area in which the terminal located, the total mobility management method comprising: (a) receiving a local domain mobility registration request message on the terminal from the mobile access gateway that receives a network attach message including information on the home agent from the terminal moving from a first local domain to a second local domain; (b) registering a location of the terminal in an area managed by the mobile access gateway according to the local domain mobility registration request message; and (c) transmitting a global domain mobility registration request message for reporting registration of the location in (b) to the home agent.

According to another aspect of the present invention, there is provided a total mobility management system comprising: a home agent managing total mobility between first and second local domains; a mobile access gateway receiving a network registration message that includes information on the home agent from a terminal moving from the first local domain to a management area in the second local domain and generating a local domain mobility registration request message on the terminal; and a local mobility management apparatus receiving the local domain mobility registration request message from the mobile access gateway, registering a location of the terminal in an area managed by the mobile access gateway, and transmitting a global domain mobility registration request message for reporting registration of the position to the home agent.

MODE FOR INVENTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood by those skilled in the art that various changes in form and details may be made therein without departing from the spirit and scope of the present invention as defined by the appended claims.

Accordingly, functions of various elements shown in the attached drawings including functional blocks represented as processors or similar concepts may be provided by using hardware with a function for performing suitable software in addition to dedicated hardware. When the functions are proved by the processors, the functions may be provided by a single shared processor or a plurality of individual processors. Some of the individual processors may be shared. In addition, terms used for a processor, a control, or similar concepts should not exclusively represent hardware with a function of executing software. It will be understood that the terms represent digital signal processor (DSP) hardware, ROM, RAM, and non-volatile memory for storing software without limitation. Other well-known hardware may be represented by the terms.

The present invention will now be described more fully with reference to the accompanying drawings, in which exemplary embodiments of the invention are shown. In the description of the present invention, if it is determined that a detailed description of commonly-used technologies or structures related to the invention may unnecessarily obscure the subject matter of the invention, the detailed description will be omitted. Hereinafter, the present invention will be described in detail by explaining exemplary embodiments of the invention with reference to the attached drawings.

FIG. 1 illustrates a network configuration for managing mobility according to an embodiment of the present invention.

Referring to FIG. 1, the network configuration according to the embodiment is constructed with local domains 110 and 120 and a global domain 130 including the local domains 110 and 120.

In a local domain 110, a base station or access point BS/AP1 102 for providing a wireless access to a terminal 101, a mobile access gateway 130 and a local mobility management device 104 are located.

A mobile access gateway 103 processes a mobility registration request of a terminal that accesses an area (sub-network) managed by the mobile access gateway 103 instead of the terminal so as to manage local mobility.

The local mobility management apparatus (local mobility anchor) 104 receives the mobility registration request of the terminal from the mobile access gateway 103 located at local domain 110, registers the current location of the terminal located at the area managed by the mobile access gateway 103 and manages local mobility of the terminal.

Then, a home agent 108 serves to manage global mobility among local domains. The local mobility management apparatus 104 may serve as a home agent. Alternatively, as shown in FIG. 1, a centralized home agent may exist separately from the local mobility management apparatus 104. In the latter case, the global domain 130 is formed as an area managed by the home agent. In this case, the global domain 130 may include a plurality of local domains.

Figure 2:
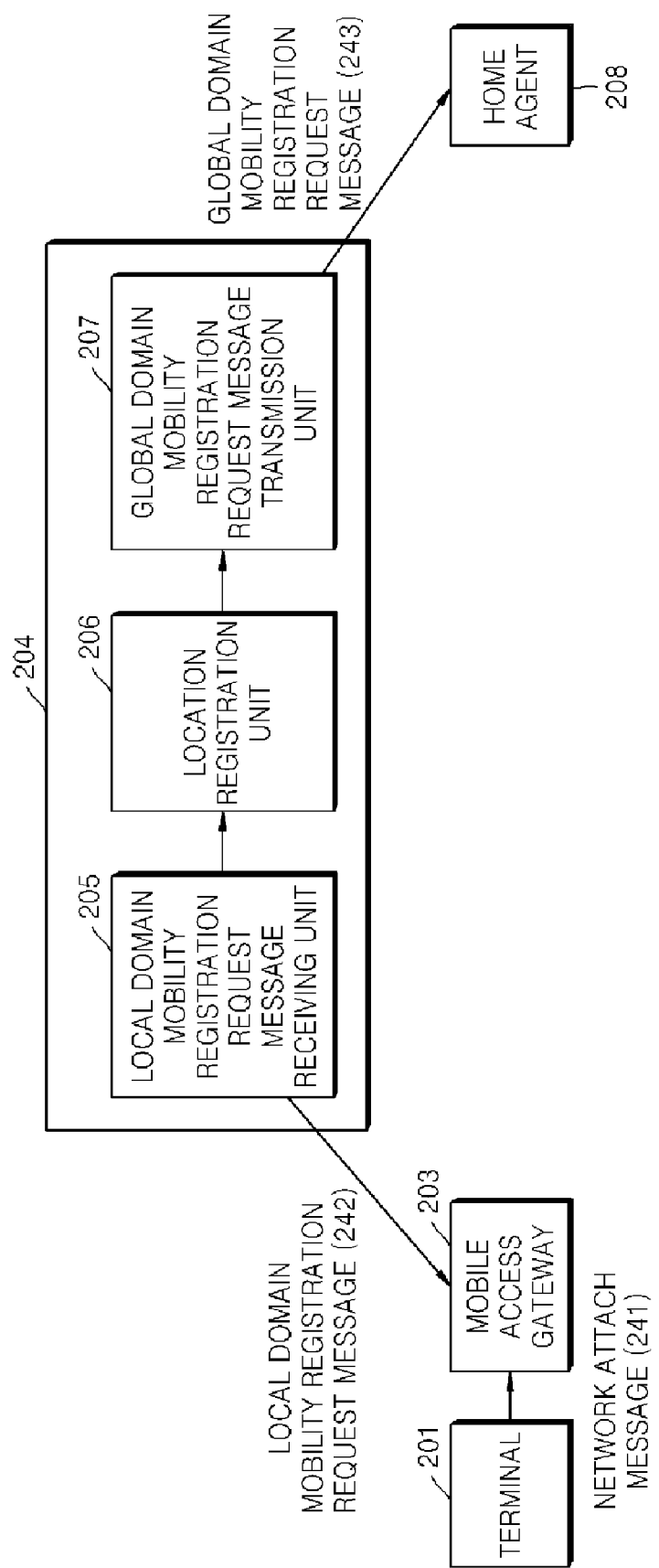
FIG. 2 illustrates a structure of a local mobility management apparatus according to an embodiment of the present invention.
Figure 3:
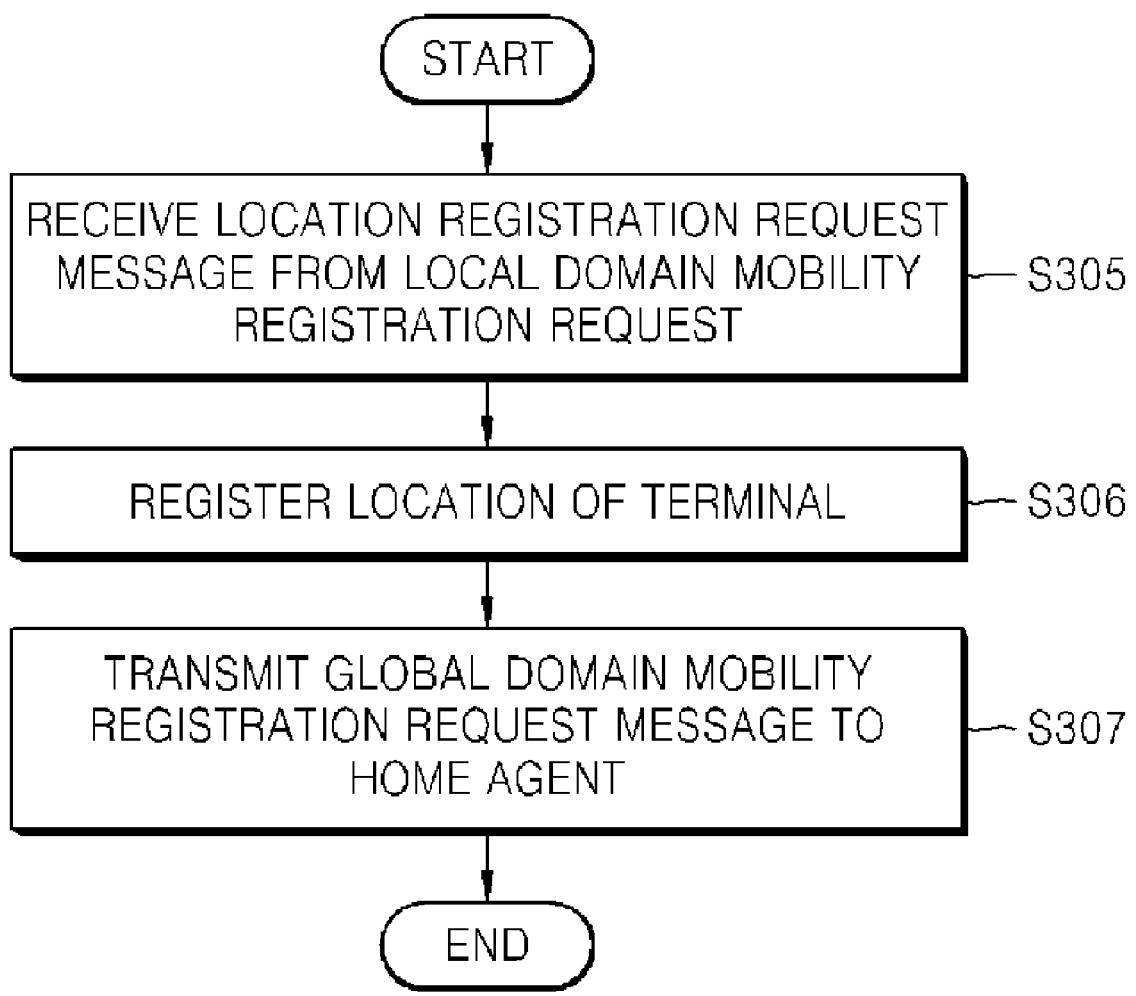
FIG. 3 is a flowchart of a total mobility management method according to an embodiment of the present invention.

FIG. 2 illustrates a structure of a local mobility management apparatus according to an embodiment of the present invention. FIG. 3 is a flowchart of a total mobility management method performed by the local mobility management apparatus shown in FIG. 2.

Referring to FIG. 2, the local mobility management apparatus 204 includes a local domain mobility registration request message receiving unit 205, a location registration unit 206, and a global domain mobility registration message transmission unit 207.

The local domain mobility registration request message receiving unit 205 receives a local domain mobility registration request message of a terminal 201 from a mobile access gateway 203 which receives a network attach message including information on a home agent 208 from a terminal 201 that moves from a first local domain to a second local domain in operation S305. The local domain mobility registration request message that is transmitted from the mobile access gateway 203 includes information on the terminal 201, information on the mobile access gateway 203, and information on the home agent 208 which is included in a network attach message and transmitted.

The location registration unit 206 registers the current location of the terminal in an area (sub-network) managed by the mobile access gateway 203 according to the local domain mobility registration request message received by the local domain mobility registration request message receiving unit 205 in operation S306.

The global domain mobility registration message transmission unit 207 transmits the global domain mobility registration request message for reporting the location registration of the location registration unit 206 to the home agent 208 in operation S307.

The home agent 208 may be a local mobility management apparatus that covers a first local area or a centralized global mobility management apparatus that covers a global domain including at least one local domain.

Figure 4:
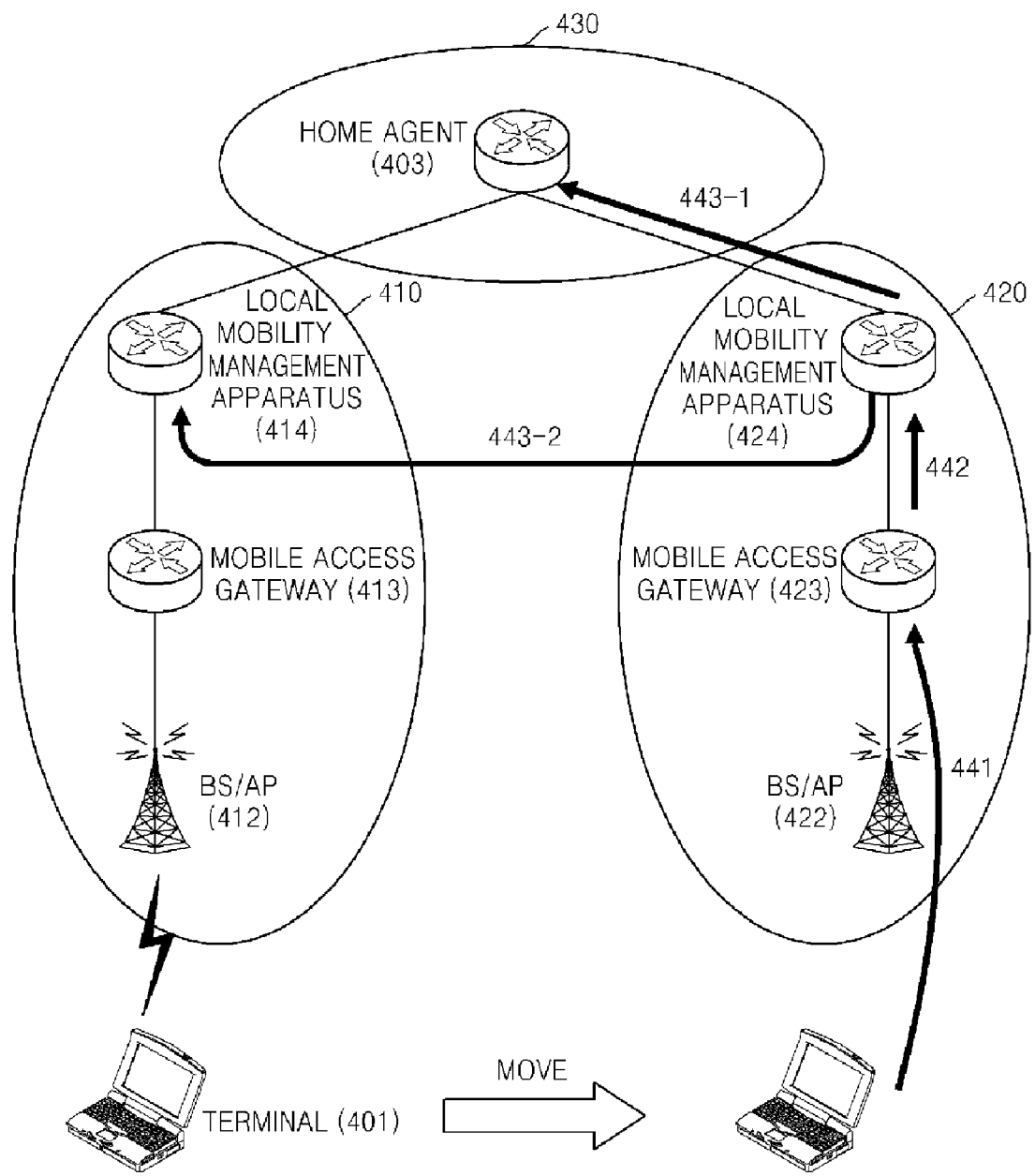
FIG. 4 illustrates a mobility management process in a total mobility management system according to an embodiment of the present invention.

FIG. 4 illustrates a mobility management process in a total mobility management system according to an embodiment of the present invention.

Referring to FIG. 4, a terminal 401 moves from a first local domain 410 to a second local domain 420 and wirelessly accesses a new base station or an access point 422.(OK) If the terminal 401 normally accesses the new base station or access point 422, the terminal 401 transmits a network attach request message 441 to a mobile access gateway 423. At this time, in the terminal 401, the network attach request message 441 includes information on a home agent which manages global mobility of the terminal 401.

If the network attach is normally performed, the mobile access gateway 423 reports to a local mobility management apparatus 424 that the terminal 401 is located in an area managed by the mobile access gateway 423 and transmits a local domain mobility registration request message 442 for requesting the current location of the terminal to be registered.

The local mobility management apparatus 424 manages mobility of the terminal by registering the location of the terminal according to the local domain mobility registration request message 442. Then, the local mobility management apparatus 424 transmits a global domain mobility registration request message 443 for reporting to the home agent that the terminal is located at an area covered by the local mobility management apparatus 424 and the local mobility management apparatus 424 registers the location.

The home agent that manages the global mobility of the terminal may be a centralized home agent 428 (case of 443-1 transmission) or a local mobile management apparatus 414 which manages the first local domain (case of 443-2 transmission). Since the network attach message that is transmitted by the terminal includes information on the home agent of the terminal, the local mobility management apparatus can directly transmit a message to the home agent of the terminal.

The total mobility management method according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. The invention can also be embodied as computer readable codes on a computer readable recording medium such as ROM, RAM, CD-ROM, magnetic tapes, hard disks, floppy disks, flash memory, optical data storage devices, and the like which can be read by a computer through a font ROM data structure.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A local mobility management apparatus which receives data toward a terminal of which location is registered from a home agent for managing total mobility between local domains and transmits the data to a mobile access gateway that manages an area in which the terminal located, the local mobility management apparatus comprising:
   a local domain mobility registration request message receiving unit receiving a local domain mobility registration request message on the terminal from the mobile access gateway that receives a network attach message including information on the home agent from the terminal moving from a first local domain to a second local domain;
   a location registration unit registering the current location of the terminal in an area managed by the mobile access gateway according to the local domain mobility registration request message; and
   a global domain mobility registration request message transmission unit transmitting a global domain mobility registration request message for reporting registration of the location by the location registration unit to the home agent.

2. The local mobility management apparatus of claim 1, wherein the local domain mobility registration request message includes information on the terminal, the mobile access gateway, and the home agent.

3. The local mobility management apparatus of claim 1, wherein the home agent is a local mobility management apparatus that covers the first local domain.

4. The local mobility management apparatus of claim 1, wherein the home agent covers a global domain including at least one local domain.

5. A total mobility management method which receives data toward a terminal of which location is registered from a home agent for managing total mobility between local domains and transmits the data to a mobile access gateway that manages an area in which the terminal located, the total mobility management method comprising:
   (a) receiving a local domain mobility registration request message on the terminal from the mobile access gateway that receives a network attach message including information on the home agent from the terminal moving from a first local domain to a second local domain;
   (b) registering a location of the terminal in an area managed by the mobile access gateway according to the local domain mobility registration request message; and
   (c) transmitting a global domain mobility registration request message for reporting registration of the location in (b) to the home agent.

6. The total mobility management method of claim 5, wherein the local domain mobility registration request message includes information on the terminal, the mobile access gateway, and the home agent.

7. The total mobility management method of claim 5, wherein the home agent is a local mobility management apparatus that covers the first local domain.

8. The total mobility management method of claim 5, wherein the home agent covers a global domain including at least one local domain.

9. A total mobility management system comprising:
   a home agent managing total mobility between first and second local domains;
   a mobile access gateway receiving a network registration message that includes information on the home agent from a terminal moving from the first local domain to a management area in the second local domain and generating a local domain mobility registration request message on the terminal; and
   a local mobility management apparatus receiving the local domain mobility registration request message from the mobile access gateway, registering a location of the terminal in an area managed by the mobile access gateway, and transmitting a global domain mobility registration request message for reporting registration of the position to the home agent.

10. The total mobility management system of claim 9, wherein the local domain mobility registration request message includes information on the terminal, the mobile access gateway, and the home agent.

11. The total mobility management system of claim 9, wherein the home agent is a local mobility management apparatus that covers the first local domain.

12. The total mobility management system of claim 9, wherein the home agent covers a global domain including at least one local domain.

* * * * *